Oct. 18, 1938.      B. OFFEN      2,133,330
WEB DRYING METHOD AND APPARATUS
Filed July 29, 1936

INVENTOR.
BERNARD OFFEN
BY Herman Seid
ATTORNEY.

Patented Oct. 18, 1938

2,133,330

UNITED STATES PATENT OFFICE 2,133,330

WEB DRYING METHOD AND APPARATUS

Bernard Offen, Chicago, Ill.

Application July 29, 1936, Serial No. 93,157

3 Claims. (Cl. 34—24)

This invention relates to drying of freshly printed paper and has for its principal object the elimination of present methods in which paper printed from raised letters is passed over electric or gas fired radiant heaters or in which the paper is passed over a steam drum and simultaneously subjected to an application of heated air. In existing radiant heater methods, temperatures as high as 1800 degrees F. are produced at the heater, although the temperature of the paper is not over approximately 300 degrees F. The steam drum method requires a large bulky drum to be driven at high speed and besides being wasteful of space and involving mechanical problems, also effects the drying by heating the paper.

Applicant's solution resides not in heating up the paper but in heating and drying the ink by exclusive use of air delivered to the printed surface at a temperature, pressure, and in a supply arrangement capable of speedy and effective drying at low cost and with minimum space requirements.

The features of the invention and improvements over present practices will be apparent from the following description of one form of application of the invention to be read in connection with the accompanying drawing in which.

Figure 1:
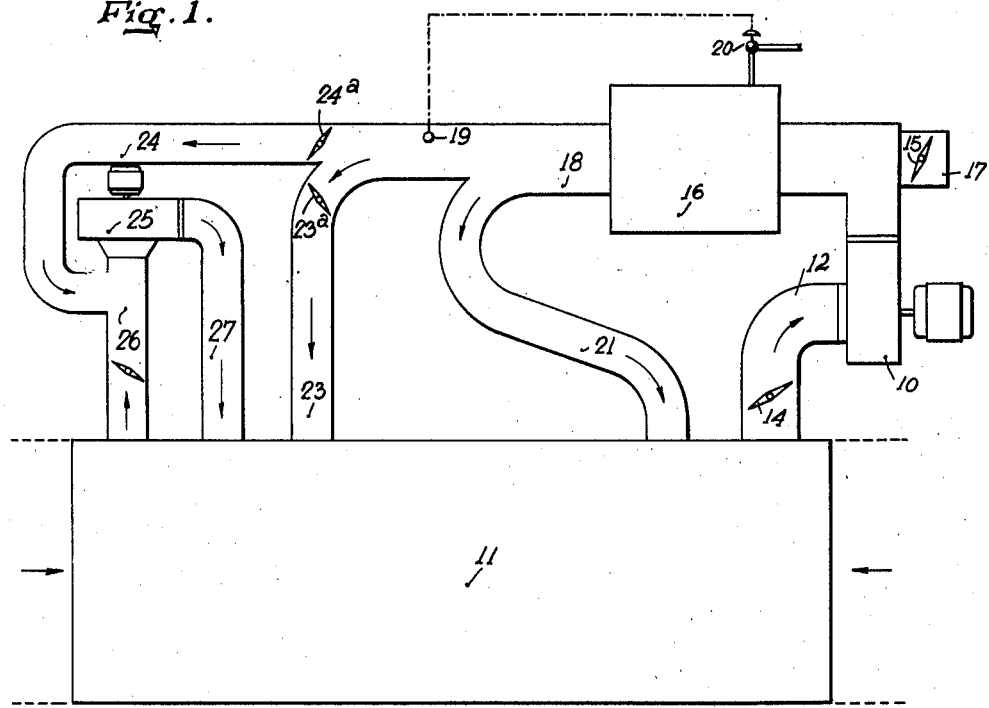
Fig. 1 is a diagrammatic plan view of a combination of apparatus adapted to be used for carrying out the invention.

Considering the drawing, similar designations referring to similar parts, numeral 10 designates a blower for delivering air to and withdrawing air from drier apparatus 11, return connection 12, supplying air to heater apparatus 16, is suitably equipped with damper 14. Air may be exhausted to the outer atmosphere through outlet 17, controlled by damper 15. The heater is preferably of the gas-fired or oil-fired type, and the air, after being directly heated by the burners, is delivered to the drier through supply duct 18. Thermostat 19 responds to changes in temperature of the air supplied from the heater and controls valve 20 which governs the flow of gas to the burners. As a result, the temperature of the air supply may be maintained at any desired point. From main supply duct 18 some of the heated air is routed to supply duct 21 and, depending upon the setting of dampers 23a and 24a, another portion goes to pressure chamber 22 directly through duct 23, or through duct 24 to blower 25 which delivers to the pressure chamber through duct 27 this air and air from the drier returned to the blower through duct 26.

Figure 2:
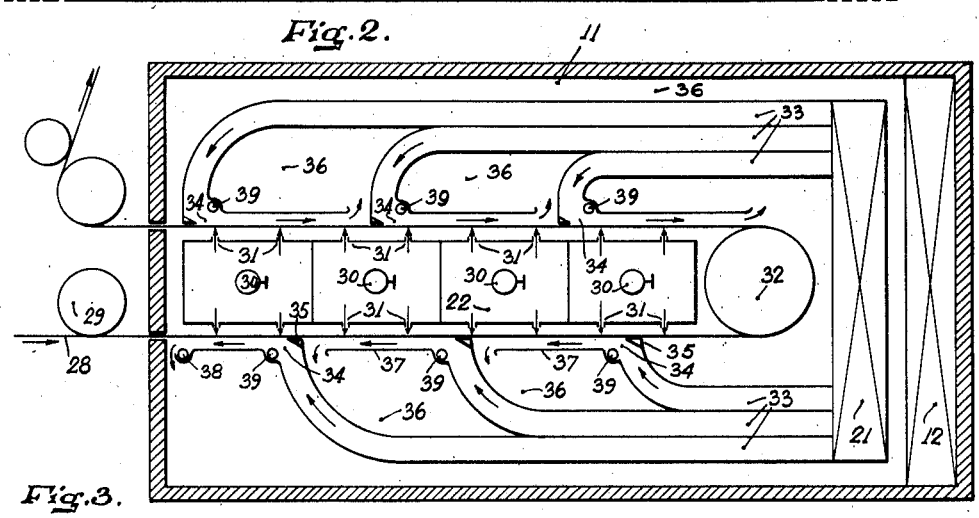
Fig. 2 is a sectional elevational diagrammatic view of the interior of a drier to which applicant's invention is applied.

Considering Fig. 2, web 28 enters drier chamber 11 with its freshly printed surface on the side opposite to that contacting with roller 29. The drier chamber is well insulated to avoid heat losses. Pressure chamber 22 suitably positioned within the drier chamber is preferably a metal chamber with polished outer surfaces to which air is supplied through supply inlets 30 from the blower 10. If desired, as shown in Fig. 1, a booster blower 25 may be employed for supplying air from heater 16 either alone or in combination with return air to inlets 30. The inlets 30 may also be suitably connected to duct 23 in those instances where the booster blower is not employed. Any desired manifold or branch duct arrangement may be used for supplying air to inlets 30 from duct 27 or duct 23. Since a variety of such arrangement which form no part, per se, of the invention, are familiar to those skilled in the art, they have been omitted from the drawing for clarity. The pressure chamber may comprise a single enclosure or be divided into a plurality of compartments. By providing valves for inlets 30, the several compartments may be maintained at different pressures. If the pressure chamber comprises a single compartment, then, of course, the pressure will be the same throughout the chamber. In either event, the outer walls of the pressure chamber are provided with perforations or nozzle openings 31 through which air from the pressure chamber is discharged against the web in its travel through the drier. In effect, the perforations or nozzles will form an air cushion or support for the paper. The roller 32 has a diameter slightly greater than the width of the pressure chamber, but the air skin formed adjacent the web effectively keeps it from dragging along the surfaces of the pressure chamber to any appreciable extent.

Heated air at desired temperature is supplied at high velocity from supply duct 21 to supply passages 33 leading to nozzle openings 34 at spaced points along the line of travel of the web through the drier. At one side of each of the nozzle openings 34 is provided a projection 35. The air is delivered at high velocity in a direction counter to the travel of the web and the projection 35 is somewhat closer to the web than the remaining portion of each opening 34, so that the air will substantially be prevented from flowing along the web to the adjacent exhaust opening of passages 36. Each nozzle opening is so shaped as shown, that the heated air is given a directional effect when discharged through the opening at high velocity; and its course of flow due to the shape of the opening and due to the shape and position of projection 35 will be along the air supply confining shields 37. The arrows show the direction of air flow from the supply openings along the web and into exhaust passages 36. The exhaust passages and the area surrounding the supply passages connect with return duct 12, which is subject to the suction from the blower 10. As a result, the heated air, subsequent to its impingement and drying action will be withdrawn through the drier chamber to return duct 12 for reheating and reuse. One or more tubes 38 adjacent the point where the web enters the drier have a series of perforations through which steam may be discharged upon the web. This will effectively prevent "case hardening" or drying of the outer printed surface before the ink beneath the surface has dried. Similar perforated tubes 39 may suitably be supplied with compressed air to be discharged against the printed surface. This will cause the film of air adjacent the surface to penetrate into the pores of the printed surface, and, further, continuously to be broken up so that the heated air will at all times contact with the printed surface due to the turbulence created.

The openings 34 are spaced so that as soon as the effect of the discharge of heated air from one opening is insufficient to assure speedy and efficient drying, then the air from the next opening will be impinged. Thus, a rapid succession of impinging air volumes are discharged at high velocity and with impacting force against the printed surface; and the flow of heated air along the web is for comparatively short distances prior to exhaust. The rate of travel of the paper is so fast that this action would cause the ink to dry without appreciably heating up the paper; whereas prior methods have brought about the drying of the inked surfaces primarily due to the heating up of the paper.

Figure 3:
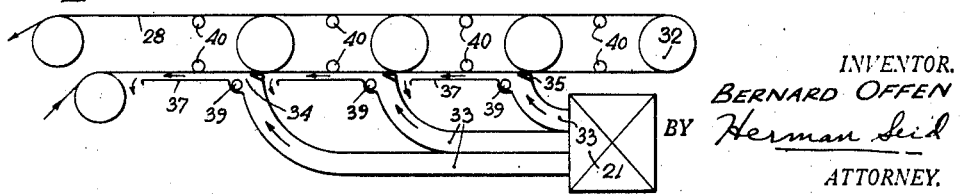
Fig. 3 is a fragmentary elevational diagrammatic view of an alternative form of application of one feature of the invention.

Fig. 3 shows an arrangement in fragmentary form adapted to be applied to the drier of Fig. 2, except that instead of pressure chamber 22, a plurality of perforated tubes 40 are employed. Heated air under pressure is supplied through these tubes and serves to buoy up the web 28 in a manner equivalent to that brought about by the openings 31 of the pressure chamber shown in Fig. 2.

Since a portion of the air withdrawn from drier chamber 11 by the blower 10 is exhausted to the outer atmosphere through outlet 17, the static pressure in drier chamber 11 tends to be lower than that of the room in which the drier chamber is situated. Thus, at the points where the web 28 enters and leaves the drier chamber 11, air leakage is inward to rather than outward from the drier chamber 11.

If desired, a low temperature control for the fuel supply may be provided. Thus, when the drying system is not in operation, enough fuel will be supplied to heater 16 to maintain the air in the system at a moderate temperature. When operation is resumed, the air may then be quickly raised to operating temperature. If desired, this control may be effected by utilizing an auxiliary burner in heater 16, under the control of a thermostat similar to thermostat 19 which controls valve 20 regulating the main fuel supply.

Since certain changes in carrying out the above method of operation and in the constructions set forth, which embody the invention may be made without departing from its scope, it is intended that all matter contained in the above description or shown in the accompanying drawing shall be interpreted as illustrative and not in a limiting sense.

I claim:

1. A method of drying printed surfaces consisting in introducing a web to an enclosed chamber, subjecting the web to a flow of steam thereagainst upon entering the chamber, and then subjecting the printed surface of the web to a series of impacting volumes of air discharged against the surface in rapid succession, the air being discharged in a direction whereby it will flow in a direction opposite to that of the direction of travel of the web, and exhausting the air from the chamber.

2. A method of drying a printed surface which consists in discharging air against the surface at a plurality of points, withdrawing said air, after it has contacted with said surface, at a plurality of points of exhaust alternatingly disposed with respect to said points of supply, moving the surface past said points of supply and exhaust, said points of supply and exhaust being so arranged that each point of supply is relatively close to a point of exhaust therebeyond in the direction of surface travel and is relatively distant from the next point of exhaust in the opposite direction, and routing the air discharged from said points of discharge in contact with the surface and in a direction counter to the direction of travel of the surface, and exhausting the air from each discharge point at the point of exhaust beyond said discharge point in a direction counter to that in which the surface is moved, whereby the air will travel a distance along the surface greater than that between a point of supply and a point of exhaust closest thereto.

3. A method of drying a printed surface which consists in contacting the surface with steam and then passing air in contact with the surface.

BERNARD OFFEN.

CERTIFICATE OF CORRECTION.

Patent No. 2,133,330. October 18, 1938.

BERNARD OFFEN.

It is hereby certified that error appears in the printed specification of the above numbered patent requiring correction as follows: Page 1, first column, line 42, strike out the comma after the numeral "11" and insert instead a period; and second column, line 25, for the word "arrangement" read arrangements; page 2, second column, line 52, claim 2, after "exhaust" insert the word next; and that the said Letters Patent should be read with this correction therein that the same may conform to the record of the case in the Patent Office.

Signed and sealed this 20th day of December, A. D. 1938.

Henry Van Arsdale

(Seal) Acting Commissioner of Patents.